United States Patent
Bierzyński

(10) Patent No.: US 11,626,831 B2
(45) Date of Patent: Apr. 11, 2023

(54) RACK, ESPECIALLY FOR PHOTOVOLTAIC MODULES

(71) Applicant: Grzegorz Kazimierz Bierzyński, Lubartów (PL)

(72) Inventor: Grzegorz Kazimierz Bierzyński, Lubartów (PL)

(*) Notice: Subject to any disclaimer, the term of this patent is extended or adjusted under 35 U.S.C. 154(b) by 236 days.

(21) Appl. No.: 16/964,976

(22) PCT Filed: Jan. 21, 2019

(86) PCT No.: PCT/PL2019/000007
§ 371 (c)(1),
(2) Date: Jul. 25, 2020

(87) PCT Pub. No.: WO2019/147149
PCT Pub. Date: Aug. 1, 2019

(65) Prior Publication Data
US 2021/0050812 A1    Feb. 18, 2021

(30) Foreign Application Priority Data

Jan. 25, 2018   (PL) .......................................... 424383

(51) Int. Cl.
*H02S 20/32*      (2014.01)
*F16H 7/06*       (2006.01)
(Continued)

(52) U.S. Cl.
CPC ............... *H02S 20/32* (2014.12); *F16H 7/06* (2013.01); *F16H 7/1254* (2013.01);
(Continued)

(58) Field of Classification Search
CPC . H02S 20/32; H02S 30/10; F16H 7/06; F16H 2007/0874; F24S 30/452;
(Continued)

(56) References Cited

U.S. PATENT DOCUMENTS 4,109,638 A * 8/1978 Matlock ................. F24S 23/74
126/573
4,203,426 A * 5/1980 Matlock ................. F24S 23/74
126/696
(Continued)

FOREIGN PATENT DOCUMENTS

DE        202010005548 U1   9/2010
DE      20 2012 004211 U1   7/2012
(Continued)

OTHER PUBLICATIONS

Database WPI, Section PQ, Week, 200848, Thomson Scientific, London, GB; Class Q74, AN 2008-H51635 XP002790178,—& ES 2 301 430 A1 (Saima Taldea SL); Jun. 16, 2008 (Jun. 16, 2008), Abstract; Figures 1-5.

(Continued)

*Primary Examiner* — Steven B McAllister
*Assistant Examiner* — Cole N Friedman
(74) *Attorney, Agent, or Firm* — Andrzej Malarz, Esq.

(57) ABSTRACT

A rack, especially for photovoltaic modules, consists of a rounded, shaped guide, on which a main frame is fitted via at least three bearing-fitted grips, with an upper frame being attached to the top of the main frame in at least two support points, the upper frame being further connected to the main frame via linear actuators. The main frame is based on the guide by means of track rollers, whose number is equal to the number of support points, and at least two anchoring elements are located on the outer perimeter of the guide, the anchoring elements arranged in at least two points within an angular distance not smaller than 15 degrees from each other. A driving chain is anchored in a non-stationary fashion on anchoring elements to the guide, from the outer side of the guide and in the lower part of the guide, and a driving mechanism is attached to the main frame, the driving (Continued)

Figure 1:
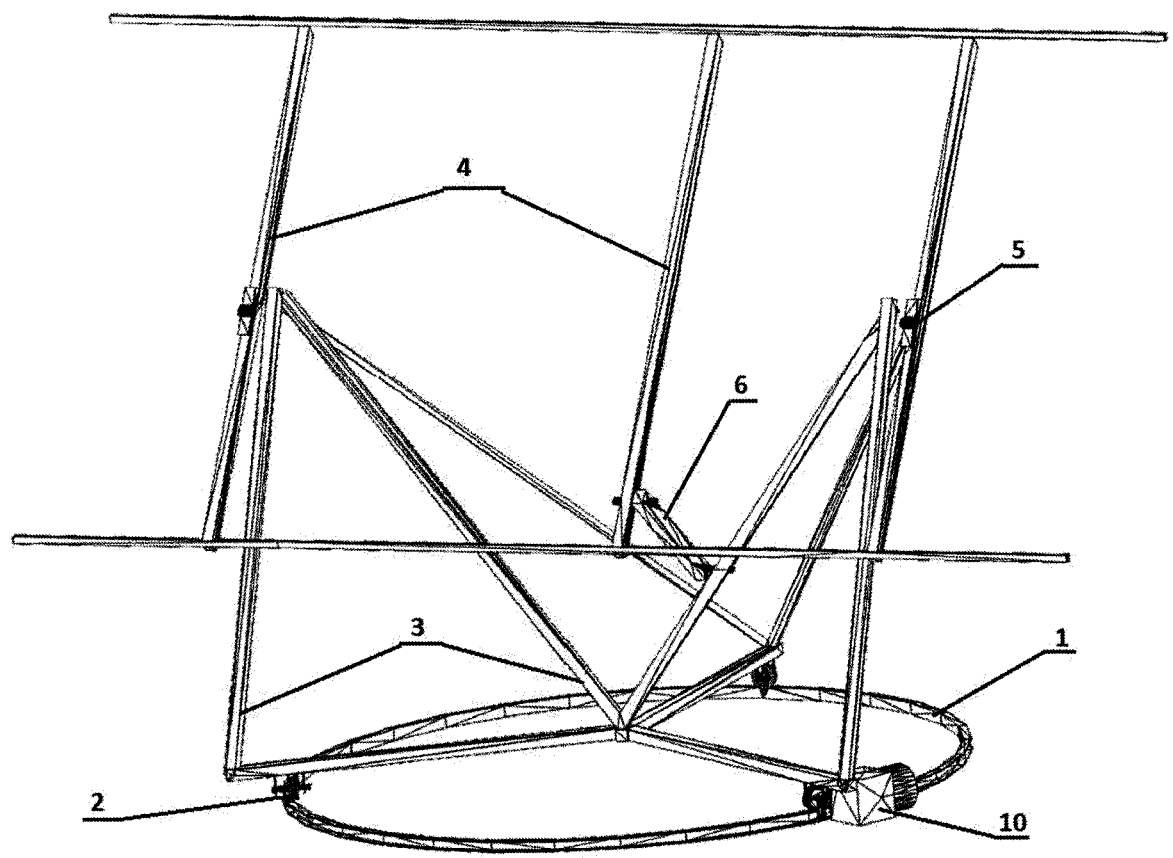

mechanism consisting of a driving toothed element, connected to a motor, and of tension rollers.

6 Claims, 8 Drawing Sheets

(51) Int. Cl.
  *H02S 30/10* (2014.01)
  *F16H 7/12* (2006.01)
  *F16M 11/20* (2006.01)
  *F24S 30/45* (2018.01)
  *F24S 50/20* (2018.01)
  *F16H 7/08* (2006.01)
(52) U.S. Cl.
  CPC ..... *F16M 11/2014* (2013.01); *F16M 11/2021* (2013.01); *F24S 30/45* (2018.05); *F24S 50/20* (2018.05); *H02S 30/10* (2014.12); *F16H 2007/0874* (2013.01); *F16M 2200/08* (2013.01)
(58) Field of Classification Search
  CPC ........... F24S 2030/133; F24S 2030/145; F24S 30/45; F24F 30/452; Y02E 10/47
  USPC ........................ 126/606; 250/203.4; 359/877
  See application file for complete search history.

(56) References Cited

U.S. PATENT DOCUMENTS

| 4,209,231 A * | 6/1980 | Sayre .................... F24S 30/452 |
| | | 359/876 |
| 4,649,899 A * | 3/1987 | Moore .................... F24S 50/20 |
| | | 250/203.4 |
| 5,022,929 A | 6/1991 | Gallois-Montbrun |
| 2002/0179138 A1* | 12/2002 | Lawheed ................ F24S 50/20 |
| | | 136/246 |
| 2010/0024861 A1 | 2/2010 | Cabanillas Saldana |
| 2014/0352686 A1* | 12/2014 | Blumenthal ........... G02B 7/183 |
| | | 126/714 |
| 2015/0022915 A1 | 1/2015 | Wang et al. |
| 2019/0194991 A1* | 6/2019 | Fontijn .................... E06B 3/46 |

FOREIGN PATENT DOCUMENTS

| EP | 1691423 A2 | 8/2006 |
| WO | 2013 046999 A1 | 4/2013 |

OTHER PUBLICATIONS

Database WPI, Section PQ, Week, 201114, Thomson Scientific, London, GB; Class Q74, AN 2010-Q78747 XP002790179,—& CN 201 656 815 U (Liu K); Nov. 24, 2010 (Nov. 24, 2010), Abstract; Figures 1-6.

* cited by examiner

RACK, ESPECIALLY FOR PHOTOVOLTAIC MODULES

The subject matter of the invention is a rotary rack, especially for photovoltaic modules.

There are presently solutions on the market that make it possible to change the position of photovoltaic panels in one or two planes. The available constructions are, however, adapted to fitting too small a number of panels on one rack for the purchase of such a system to become economically justifiable. Limitation in the panel plane size is a result of the construction not well suited to adverse weather conditions, e.g. wind force. Proposed rack constructions, e.g. column constructions, consume a significant part of the generated energy to position the panels, especially when affected by air masses.

Some devices found on the market enable fitting of a greater number of modules but they are costly in production because of the expensive methods for bearing and for driving of the column construction. Large, non-modular elements make it necessary to use specialised transportation and tools during assembly and consequently inadequate design-connected outlays. Such approach results in building vast farms of installations of the type with a relatively low return on investment.

So far, a centrally located column has been used to maintain the centric bearing and because of it being impossible to use a drive mechanism other than the one based on a toothed ring. Column solutions lead to an increase in the production costs of racks and increase the complexity of the set.

It is important for the installation under construction to be of the smallest possible size and to achieve the highest efficiency possible since the overall impact of such installations on the environment is negative, as far as the energy demand and pollution generated during the production and logistics processes of one photovoltaic module are considered. A typical panel placed fixedly in a standard position at a geographical altitude of less than −30° and more than 30° is not able to generate as much energy in its life cycle as it was used for its production, transportation and assembly. It is necessary to optimise the operating conditions of the installations of the type in order to achieve a positive energy balance.

The rack for photovoltaic modules consists of a rounded, shaped guide, on which a main frame is fitted via a bearing-fitted grip. An upper frame is attached to the main frame in at least three support points, the upper frame for fitting photovoltaic panels and other energy receivers or instruments which are to be directed to a defined reference point. The upper frame is preferably reinforced with additional bars. The upper frame is further connected to the main frame via linear actuators intended to change the inclination angle of the upper frame in relation to the main frame. The main frame slides over the guide by means of track rollers, whose number is equal to the number of support points. At least two anchoring elements are located on the outer perimeter of the guide, the anchoring elements being arranged in at least two points, within an angular distance not smaller than 15 degrees from each other. A driving chain is anchored in a non-stationary fashion on anchoring elements to the guide, from the outer side of the guide and in the lower part of the guide. Moreover, a driving mechanism is attached to the guide, the driving mechanism consisting of a driving toothed element, connected to a motor, and of tensioning rollers, through which the driving chain is drawn. Each track roller is located in a housing, on which the main frame rests. A shaft is located in the axis of the track roller, with a grip with a fixing roller being attached on the shaft, the fixing roller abutting the upper inner part of the guide, which enables the track roller to smoothly slide together with the fixing roller. The shaft is preferably seated at both its ends movably by means of linear bearings, which makes it possible for the entire set to axially slide together with the shaft in relation to the housing so as to remedy the deficiencies in the shape of the guide or the changes caused by the difference in the ambient temperature. The mutual positioning of the track roller and the fixing roller is fixed and prevents the track roller from falling out of the guide. In another preferred embodiment, the shaft is seated at both its ends fixedly by means of a stationary mounting and a movable mounting is a part connecting and fixing the mutual setting of the track roller and the fixing roller. The movable mounting together with the rollers slide axially over the guide. The guide of a relatively long perimeter, of 1.5 m, is preferably made of sectionally bent profiles, whereby it can be assembled at the site of installation. The guide can be made of channel bars or a set of angle bars.

Manufacturing of a guide of a relatively long perimeter, bent from profiles in sections so that it could be assembled at the site of installation, also required solving of vital technological problems, which are solved by:

i) designing a chain drive in relation to the guide, with non-fixed anchoring, such that the chain, closed within the perimeter (there are no breaks in continuity), passes through a toothed gear attached to the main frame at each place of the guide, the anchoring of the chain does not restrain the rotation of the set. With this solution it is possible to perform multiple rotations of the set around the vertical axis. The use of the chain significantly reduces the production costs of the guide and eliminates problems connected with inaccurate matching of the individual modules of the lower guide, ii) designing a set of rollers transferring the weight of the main frame onto the guide, the rollers being capable of maintaining an appropriate position in relation to a defined section of the guide such that smooth running is maintained even on a guide in which an irregular oval is allowed because of the influence of varying temperatures during the year and assembly tolerances, iii) designing a set of rollers ensuring appropriate fixation of the position of the main frame on the guide, iv) designing a drive mechanism enabling the main frame to move in multiple rotational movements over the guide within the full range of 360 degrees.

The inventive rack is intended to maintain an application-specific horizontal and vertical deviation of a rack-attached instrument/receiver, and especially to appropriately adjust the angles of deviation from cardinal directions of photovoltaic panels in relation to the changing position of the Sun, such that the sunbeams hit the modules fitted on the panel at an optimal angle for the longest possible time in a defined cycle.

This solution enables it to significantly increase in the efficiency of photovoltaic modules. According to the measurements taken at 51° 28'N 22° 36'E, the energy effectiveness of photovoltaic modules mounted on the inventive rack increased throughout the year by 38% as compared to the modules of the same power mounted conventionally in the south direction 0° and angled at 35°. Such an increase in effectiveness enables significant reduction of investment costs and space necessary to obtain the intended energy effectiveness of the entire installation.

As opposed to other constructions of the type, the inventive rack was designed to achieve the longest possible diameter of the guide in relation to the width of the entire set. By suitably designing the set of rollers, it was at the same time possible to eliminate the expensive central driving column which complicates the installation.

As the economically optimal diameter of the set is 1.5 m at the minimum, the guide needs to have a modular structure, which enables it to achieve this aim without logistic limitations that appear with unitary elements. By achieving a relatively long diameter of the guide in relation to the height of the rack, it became possible to achieve three very important properties which are unavailable in other constructions:

1. Low energy demand of the electric motor intended for the drive, responsible for positioning the set in east-west directions. It also became possible to use a small stepper motor in order to increase the precision of the rotational motion. The motion of the set following the position of the Sun means a rotation of about 0.25 degrees per 1 minute depending on the time of the day and year.

2. Simplified construction of mechanical gears and thus lower energy losses of the drive. With such a long diameter of the set, much larger torques are achieved, which makes it possible to use a smaller and cheaper worm drive, whose self-locking ensures stability of the position of the rack also with the power supply of the motor being cut off.

3. Increased stiffness of the set using the properties of the frame construction and larger intervals between support points of the main frame, and thus also the upper frame, being achieved. This minimises the threat for the construction of the type being the gusty wind accompanying the growing number of climate anomalies.

The subject matter of the invention is shown in the drawing, wherein

Figure 2:
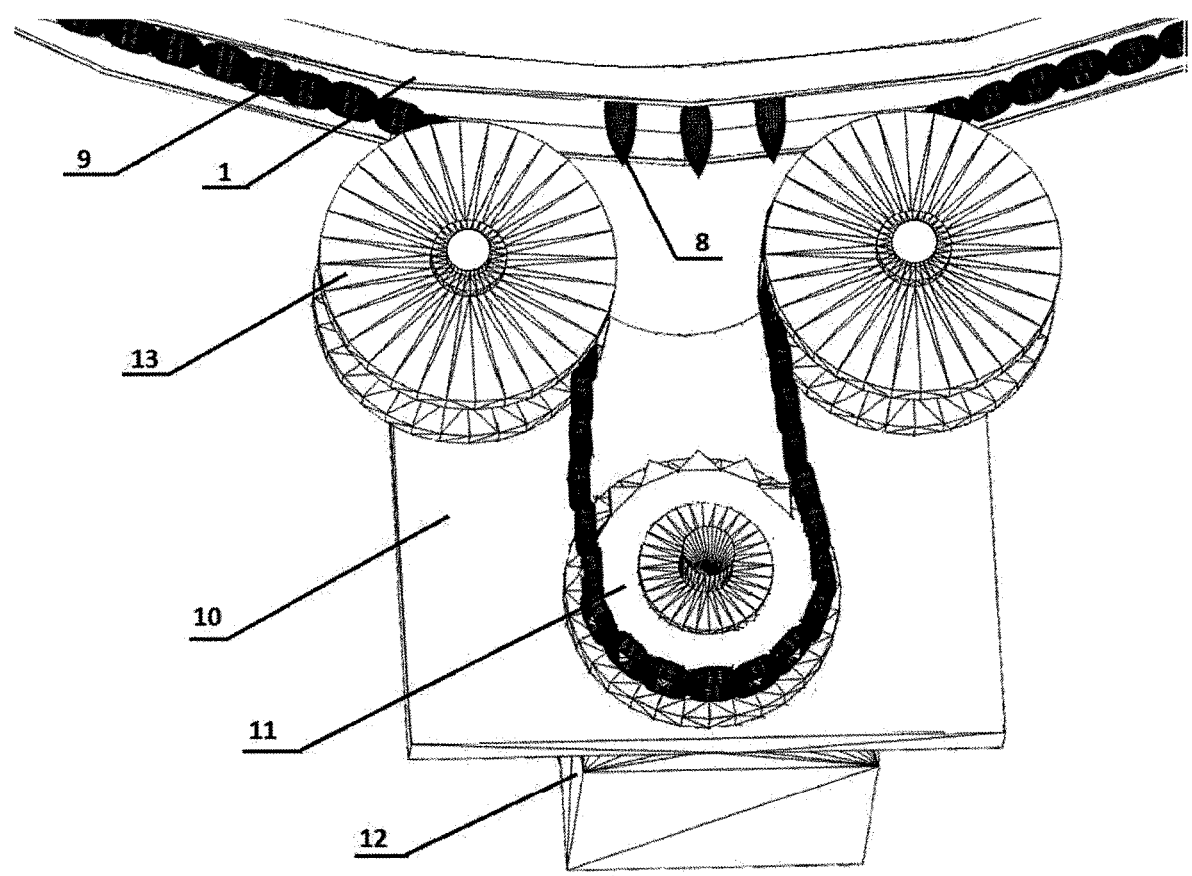
Figure 3:
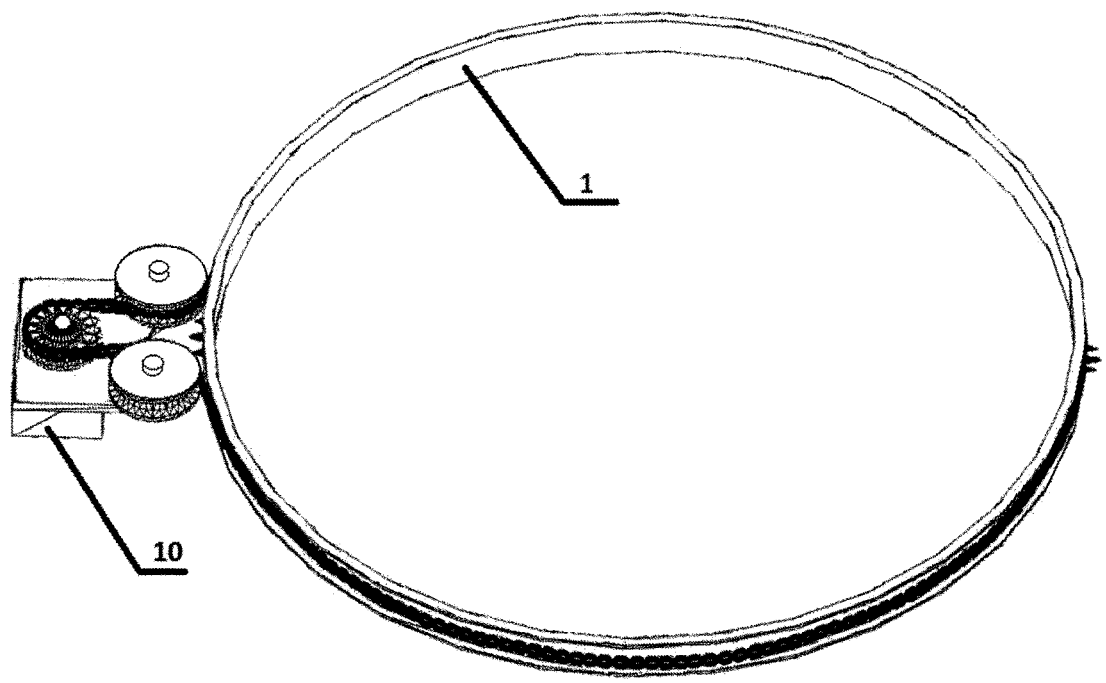
Figure 4:
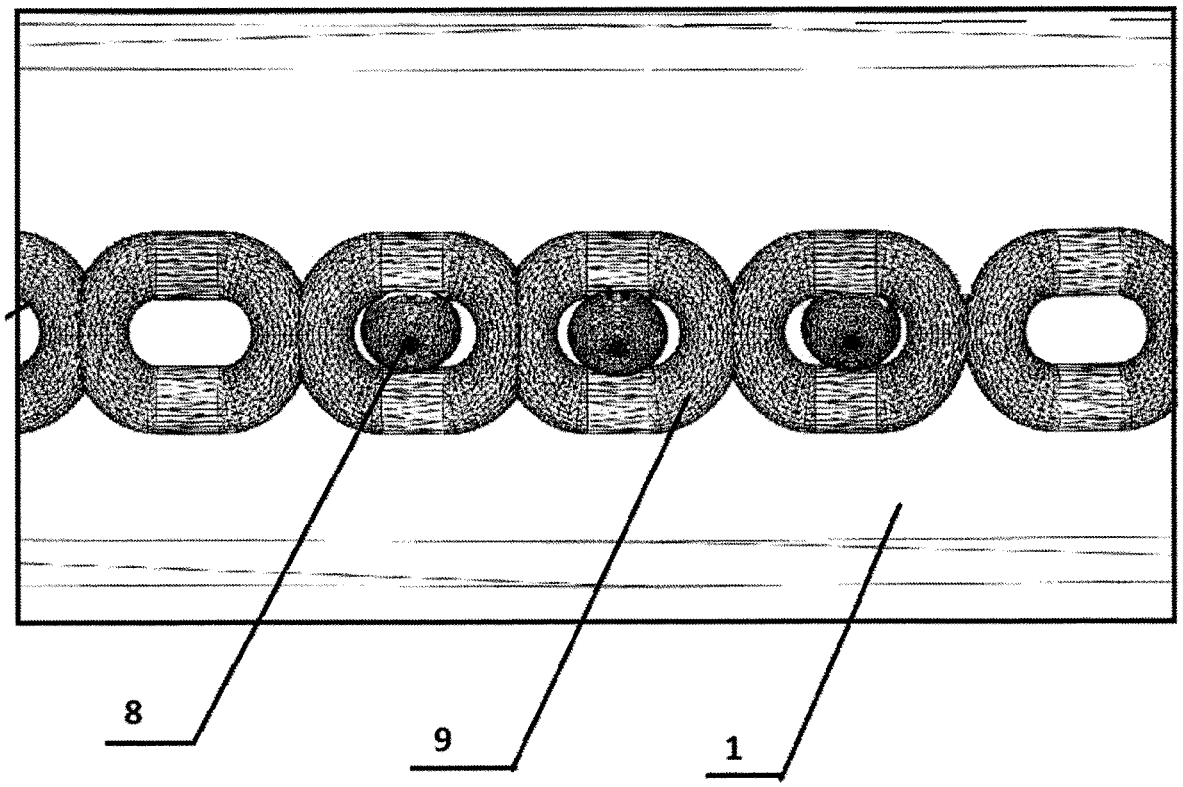
Figure 5:
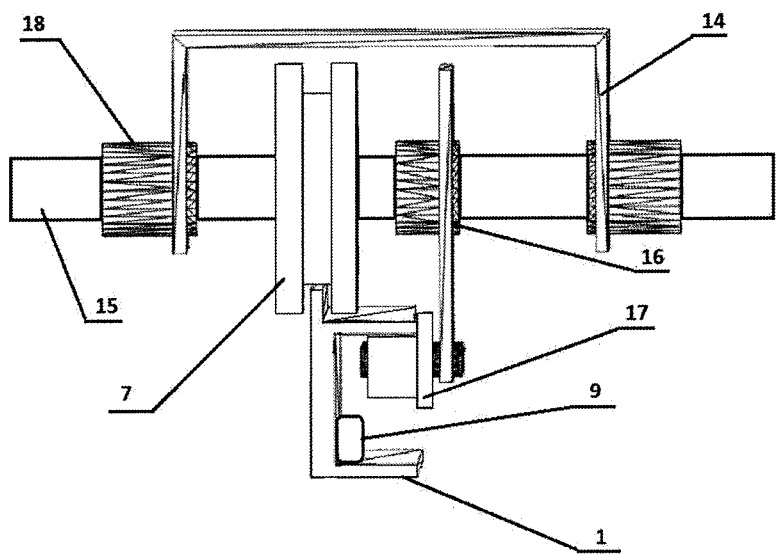
Figure 6:
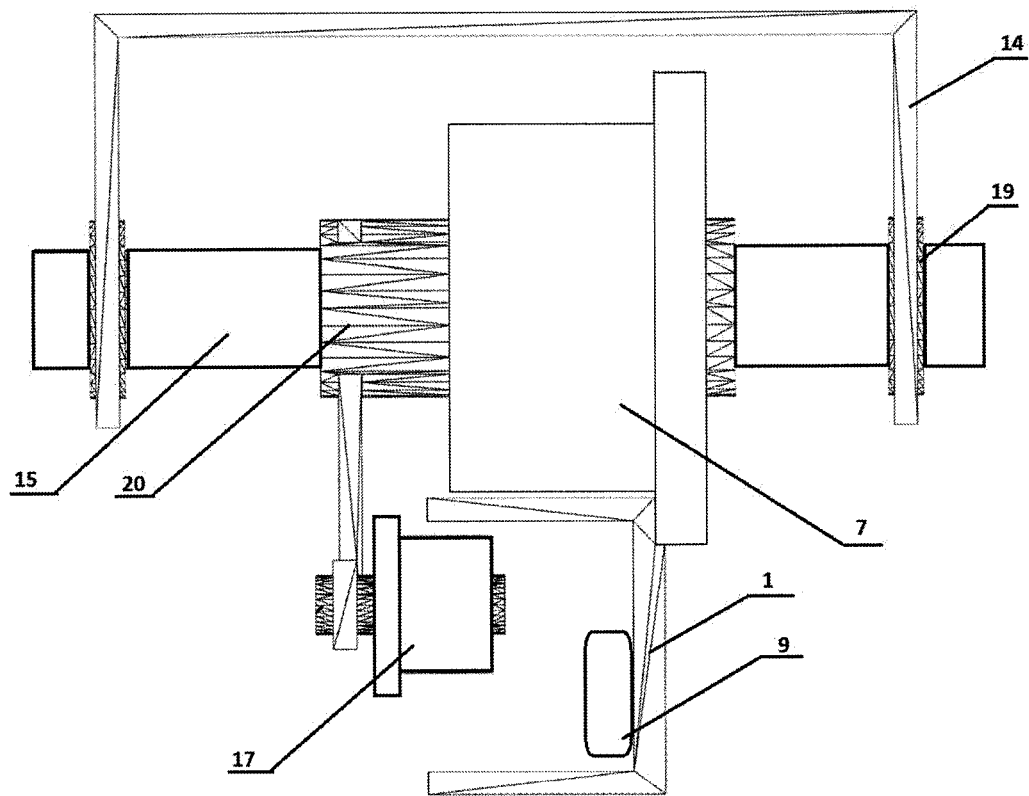
Figure 7:
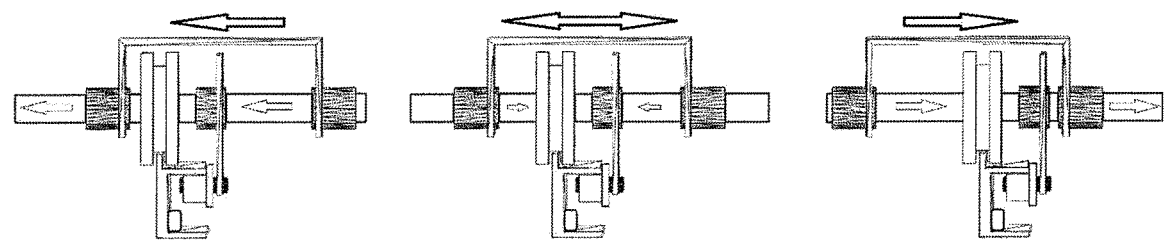
Figure 8:
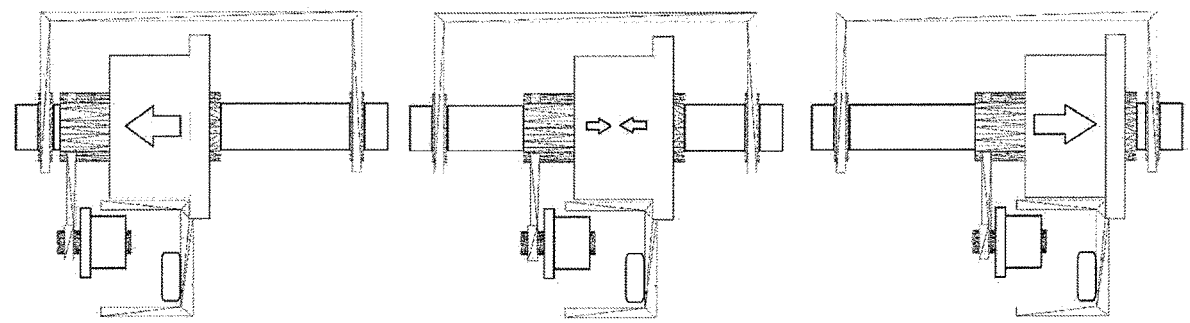
Figure 9:
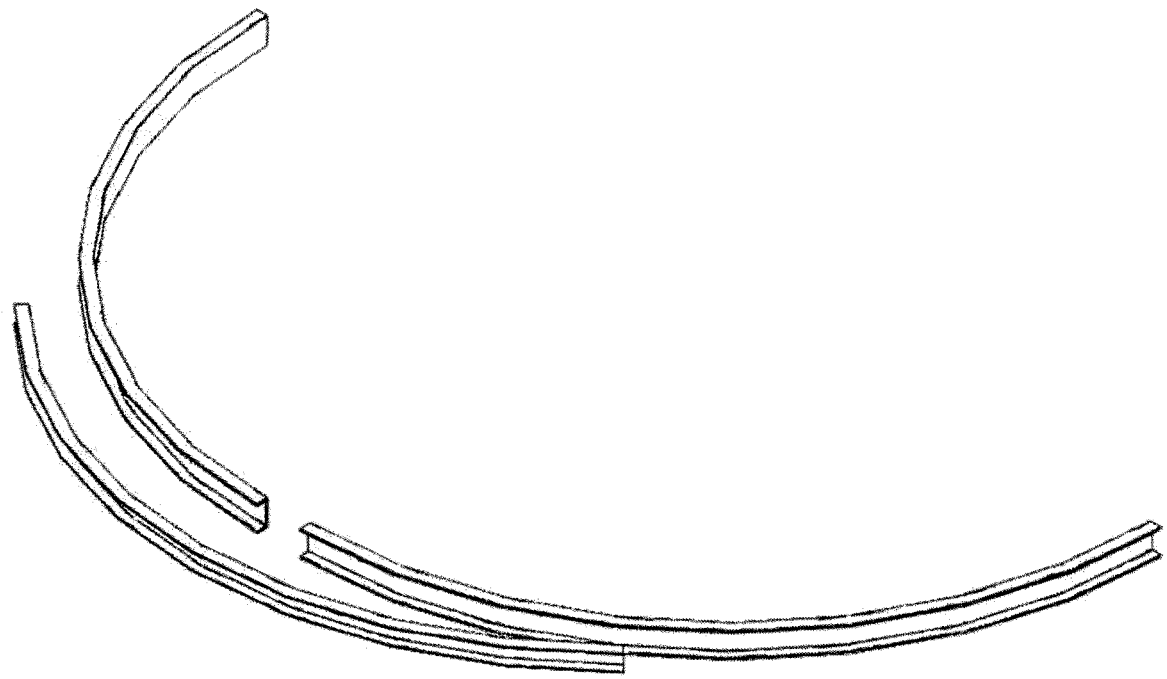
Figure 10:
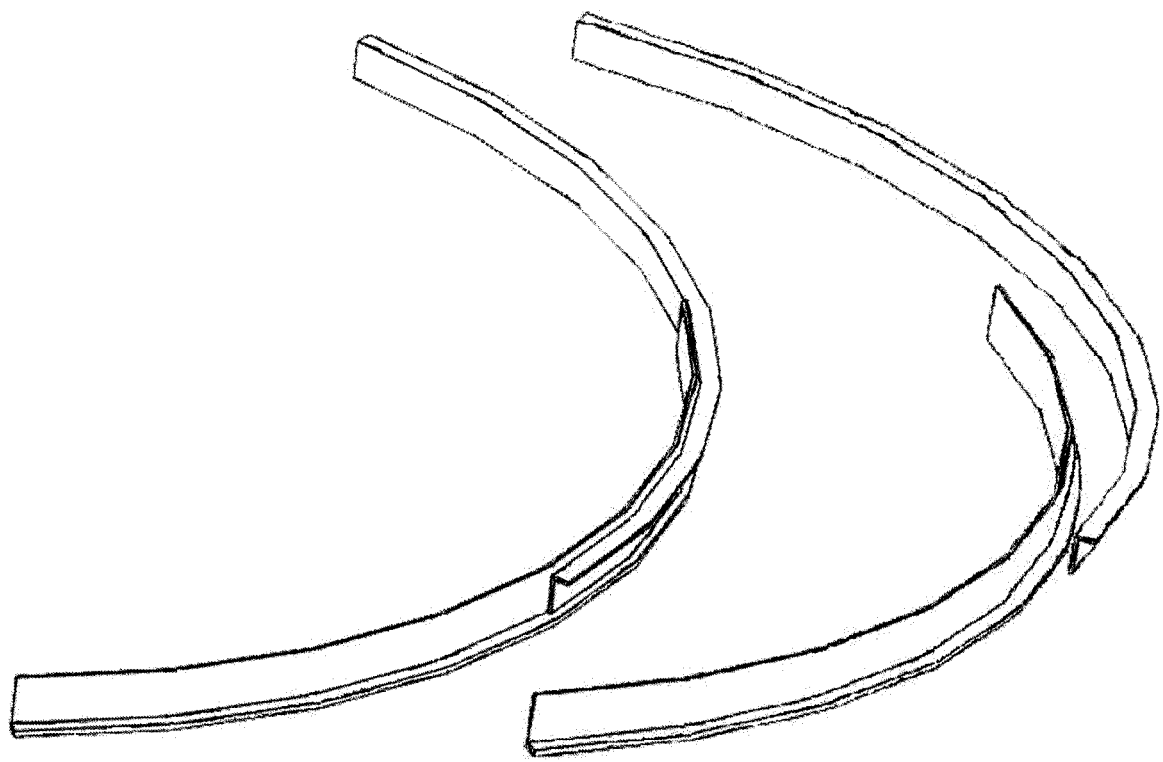
Figure 11:
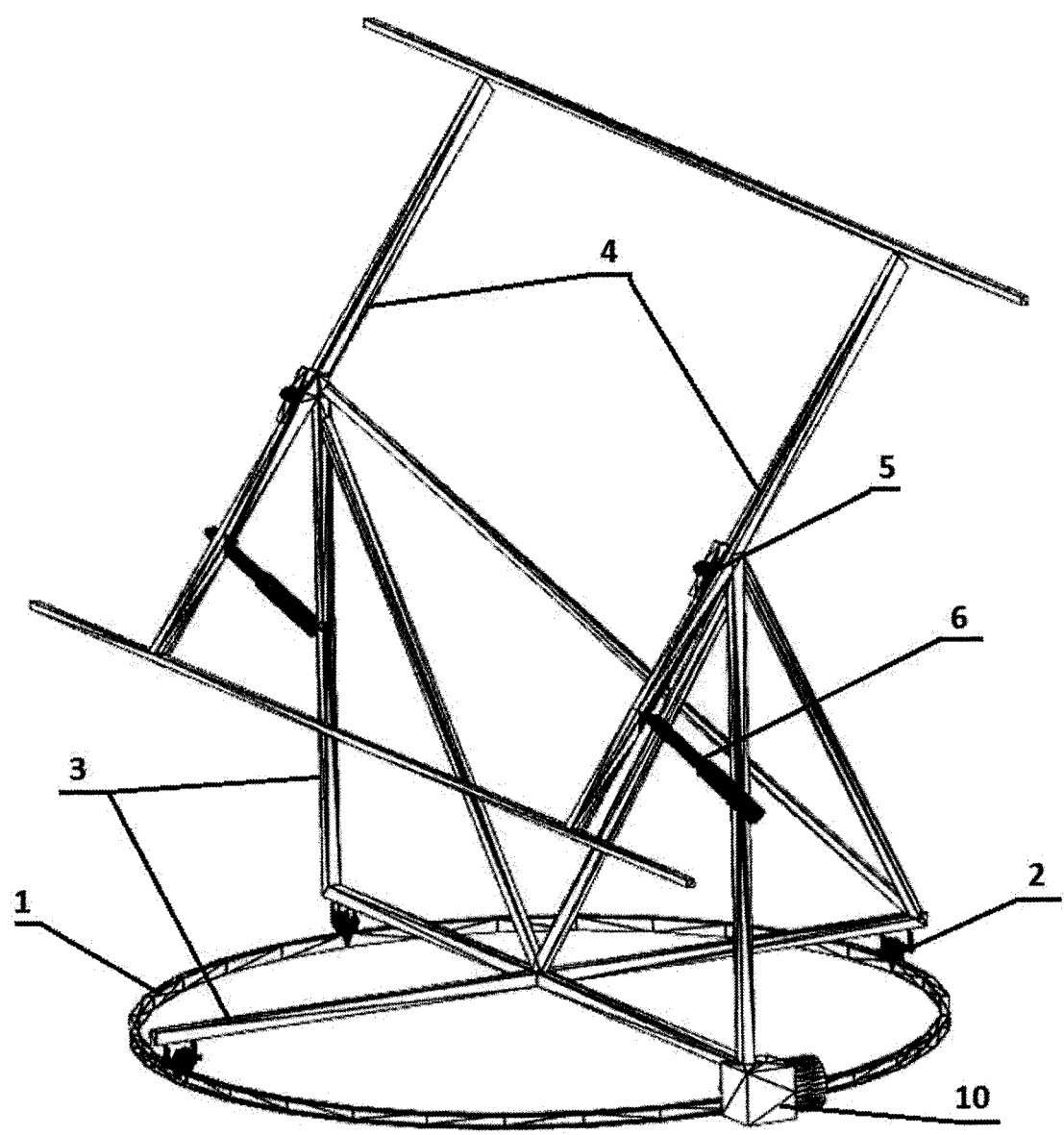
Figure 12:
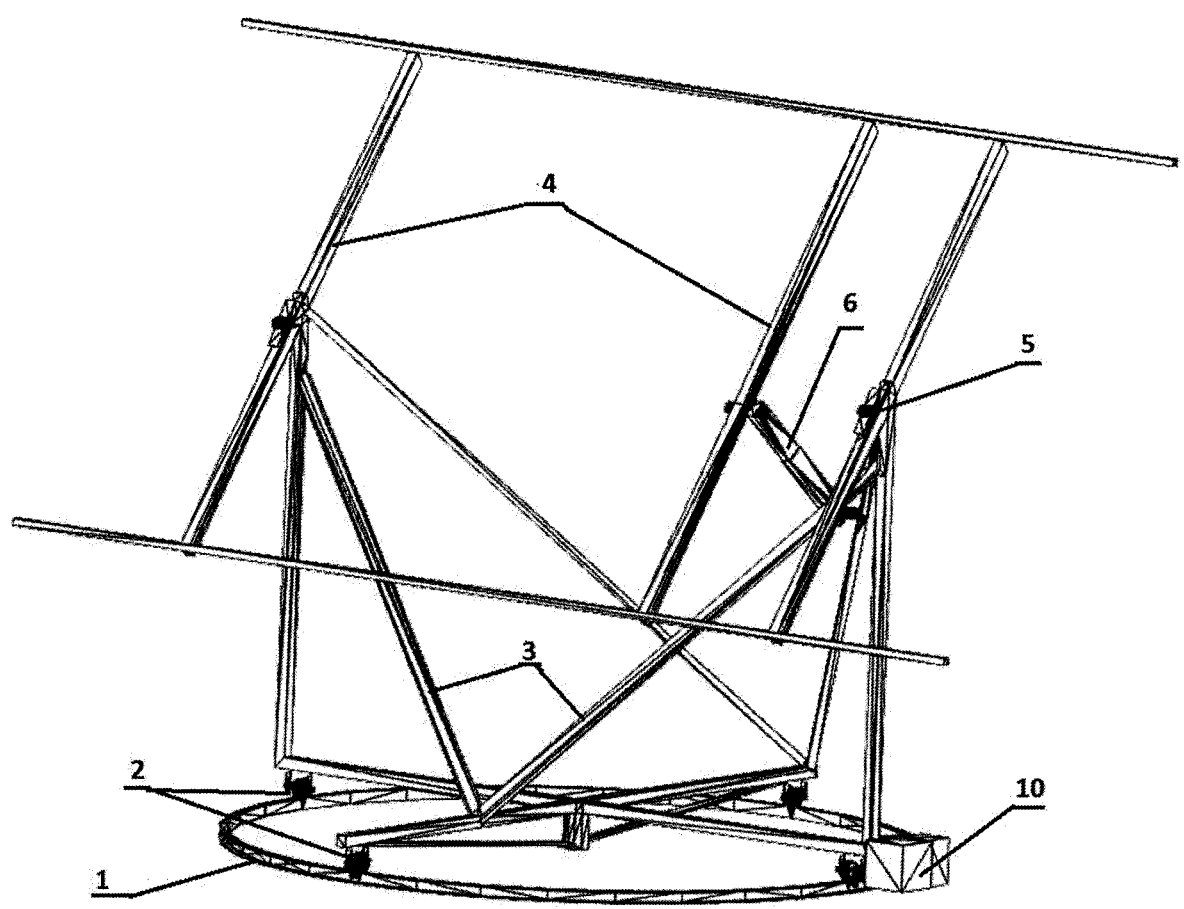

FIG. 1 shows a general view of a rack with three support points of the main frame, FIG. 2 shows a portion of a guide with a driving system, FIG. 3 shows a guide with a driving system, FIG. 4 shows a portion of a driving chain anchored on the anchoring element, FIG. 5 shows a view of an element with the track roller in a version with a movable shaft, FIG. 6 shows a view of an element with a track roller in the version with a fixed shaft, FIG. 7 shows the operational range of the element shown in FIG. 5, FIG. 8 shows the operational range of the element shown in FIG. 6, FIG. 9 shows elements of a guide made of channel bars, FIG. 10 shows elements of a guide made of angle bars, FIG. 11 shows a rack with four support points of the main frame, FIG. 12 shows a rack with four support points with additional reinforcement.

EXAMPLE 1

A rack for photovoltaic modules consists of a rounded, shaped modular guide 1 made of sectionally bent profiles in the shape of channel bars, with a main frame 3 being fitted via at least three bearing-fitted grips 2 on the guide 1, with an upper frame 4 being attached to the main frame 3 in two support points 5. The upper frame 4 is further connected to the main frame 3 via linear actuators 6. Two anchoring elements 8 are located on the outer perimeter of the guide 1, the anchoring elements 8 being arranged in two points, within an angular distance of 180 degrees from each other. A driving chain 9 is anchored in a non-stationary fashion on anchoring elements 8 to the guide 1, from the outer side of the guide and in the lower part of the guide. A driving mechanism 10 is attached to the main frame 3, the driving mechanism 10 consisting of a driving toothed element 11, coupled to a motor 12, and of two tension rollers 13, through which the driving chain 9 is drawn. A track roller 7 is located in a housing 14, on which the main frame 3 rests, and furthermore, a shaft 15 is located in the axis of each track roller 7, with a grip 16 being attached on the shaft 15, the grip 16 with a fixing roller 17 abutting the upper inner part of the guide 1. The shaft 15 is seated at both its ends movably by means of linear bearings 18, which enables axial sliding of the entire set together with the shaft 15 in relation to the housing 14, thus remedying the deficiencies in the shape of the guide 1.

Such a method of anchoring the driving chain 9 eliminates the limitation on the rotational movement of the rack, which means that performing multiple rotations in the vertical axis is possible.

The driving chain 9, drawn through the driving toothed element 11 of the driving mechanism 10, ensures that the entire construction can rotate full range around the vertical axis. By means of the tension rollers 13, the driving mechanism 10 ensures appropriate tension of the driving chain 9 in operation, thus remedying the change in length dependent on the ambient temperature. Where the photovoltaic modules are fitted on the upper frame 4, the angle of rotation of the main frame 3 is adjusted to the current position of the Sun in relation to the east-west direction.

The upper frame 4 is attached horizontally on the top of the main frame 3 bearing fitted support points 5, such that it is possible to regulate its deviation in the horizontal axis by means of the linear actuators 6. When the photovoltaic modules are fitted, the inclination angle of the upper frame 4 depends on the height of the Sun above the horizon.

The upper frame 4 may be reinforced with additional bars depending on the planned rack loading. It is possible to reduce the weight of the entire set while maintaining its load-bearing capacity by using profiles made of light metals or composites.

The construction of the rack enables significant optimisation of logistics costs, especially when the construction is assembled in places of difficult accessibility.

Depending on the method of connecting elements, it is possible to completely eliminate specialised tools.

EXAMPLE 2

A rack is of an identical structure as in example 1 but its guide 1 is made of sectionally bent profiles in the shape of angle bars and has four bearing-fitted grips 2 of the main frame 3 and the shaft 15 is seated at its both ends fixedly by means of a stationary mounting 19 and movably by means of a movable mounting 20. The movable mounting 20 together with the track roller 7 and the fixing roller 17 slide axially over the guide 1 and remedy the deficiencies in its shape.

The invention claimed is:

1. A rack, especially for photovoltaic modules, having a frame and a base, wherein the rack consists of a rounded, shaped guide (1) on which a main frame (3) is fitted via at least three bearing-fitted grips (2), with an upper frame (4) being attached to the top of the main frame in at least two support points (5), the upper frame being further connected to the main frame (3) via linear actuators (6), with the main frame (3) being based on the guide (1) by means of track rollers (7), whose number is equal to the number of bearing-fitted grips, and at least two anchoring elements (8) are located on the outer perimeter of the guide (1), the anchoring elements arranged in at least two points within an angular distance not smaller than 15 degrees from each other, and furthermore, a driving chain (9) is anchored in a non-stationary fashion on the anchoring elements (8) to the guide (1), from the outer side of the guide and in the lower part of the guide, with a driving mechanism (10) being attached to the main frame (3), the driving mechanism consisting of a driving toothed element (11), connected to a motor (12), and of tension rollers (13), through which the driving chain (9) is drawn, and the track roller (7) is located in a housing (14), on which the main frame (3) rests, and furthermore, a shaft (15) is located in the axis of each track roller (7), with a grip (16) with a fixing roller (17) being attached on the shaft, the fixing roller based on the upper inner part of the guide (1), wherein the shaft (15) is seated at both its ends movably by means of linear bearings (18).

2. The rack according to claim 1, wherein the guide (1) is made of sectionally bent profiles.

3. The rack according to claim 2, wherein the guide (1) is made of channel bars.

4. The rack according to claim 2, wherein the guide (1) is made of a set of angle bars.

5. The rack according to claim 1, wherein the upper frame (3) is reinforced with additional bars.

6. The rack according to claim 1, wherein the shaft (15) is seated at both its ends fixedly by means of a stationary mounting (19) and movably by means of a movable mounting (20).

* * * * *